March 25, 1969 F. F. LADD, JR., ET AL 3,435,295
INTEGRATED POWER DRIVER CIRCUIT
Filed Sept. 28, 1966
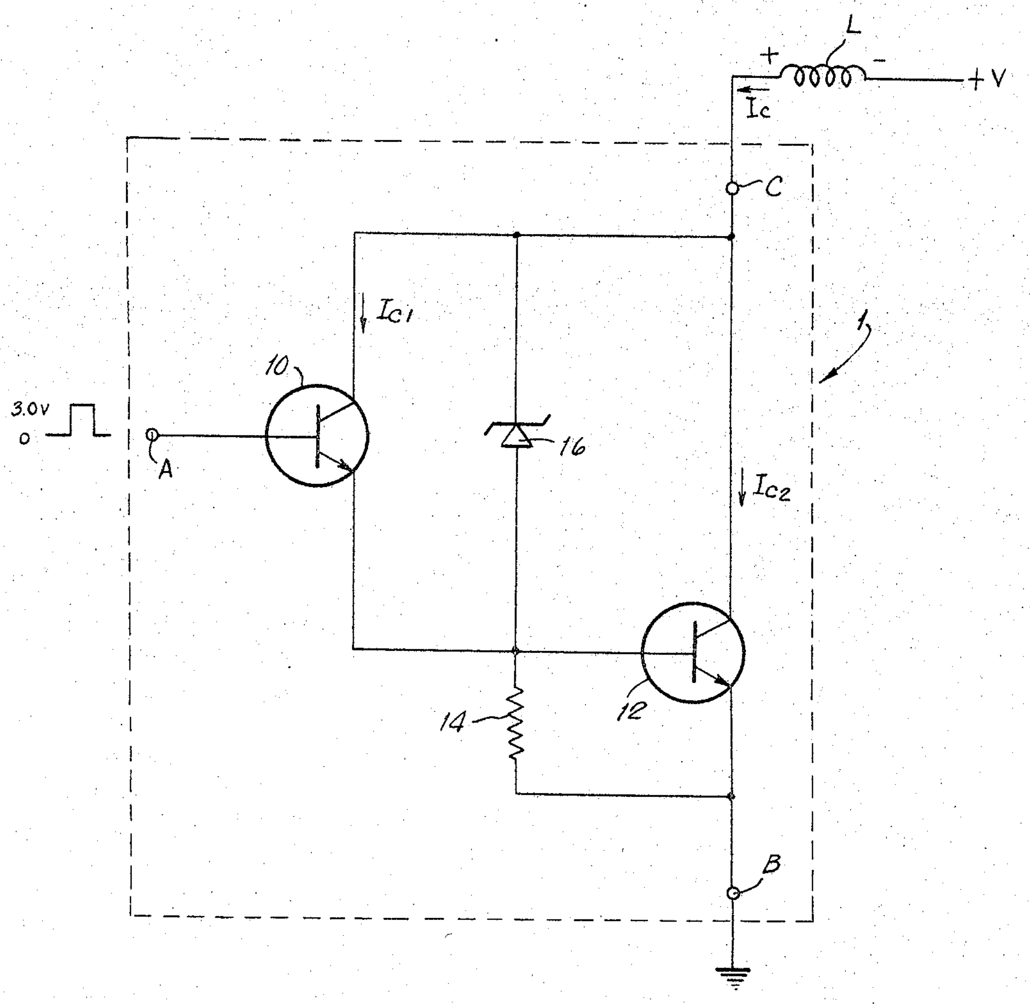
INVENTORS
FREDERICK F. LADD, JR.
LYNN W. MARSH, JR.
BY JOHN E. MUSCHINSKE
John F. Ohlandt Jr.
ATTORNEY 3,435,295

INTEGRATED POWER DRIVER CIRCUIT

Frederick F. Ladd, Jr., Newbury, and Lynn W. Marsh, Jr., Melrose, Mass., and John E. Muschinske, Sunnyvale, Calif., assignors, by mesne assignments, to Mohawk Data Sciences Corporation, East Herkimer, N.Y., a corporation of New York Filed Sept. 28, 1966, Ser. No. 582,616
Int. Cl. H02h 7/20; H01h 47/32
U.S. Cl. 317—33 7 Claims This invention relates to semiconductor circuits, and more particularly, to a power driver circuit useful for driving heavy currents into inductive loads.

Great interest has centered on the development of integrated circuits in the semiconductor arts during the past five years. The major effort in this field has been concentrated, particularly for computer applications, on electronic switcihng circuits that function as logical components for processing digital information. Such logical components are normally operated at very low power levels. Their design proceeds on the assumption of operation at these low power levels such that they are incapable of directly driving output devices. When it is necessary to drive a heavy load such as a hammer driver for use in a high speed output printer, very high power levels are involved and a power stage must be employed for execution of such an output function.

It has become extremely desirable that the power stage which is designed to drive such heavy loads be miniaturized as well as the aforesaid logical components. In the miniaturization or formation as an integrated circuit, a power driver such as the well-known Darlington circuit is a suitable candidate for this purpose.

However, in employing a power driver circuit for driving loads, such as hammer driver mechanisms, it has been found that under typical switching conditions the transsistors in the circuit must be protected against the back EMF's that are generated as the power driver circuit switches to the off state. Although different protective means have been provided heretofore in various arrangements, these have not proven adaptable for the problems encountered with integrated power drivers capable of driving heavy currents of the order of five amperes.

Accordingly, it is a primary object of the present invention to provide a protective means for a semiconductor power driver circuit that is employed to drive inductive component loads.

Another object is to provide a protective means that is readily adapted for inclusion into a monolithic semiconductor power driver circuit.

A more specific object is to sharpen and stabilize the response of a power driver circuit upon turnoff thereof.

Although the problem of driving heavy inductive loads will be explained in the context of a specific power driver circuit, it will be appreciated from the description which follows that the concept of the present invention is applicable to power driver problems encountered in other configurations.

In fulfillment of the above objects, the present invention contemplates the connection of an avalanche regulator, represented by a Zener diode, as a protective means so as to protect fully the power driver from adverse effects produced by inductive component loads. As is well-known to those skilled in the art, a Zener diode has a characteristic such that an extremely high impedance is provided prior to reaching the breakdown voltage. A Zener diode also provides an extremely sharp breakdown by which is meant that the device has a constant voltage region in its reverse biased characteristic. In accordance with the present invention the Zener diode is connected directly across the collector and base terminals of the driving transistor. In the context of a Darlington configuration the Zener diode is connected across the collector and base terminals of the final transistor. By virtue of this connection the Zener diode is not active during the storage cycle, that is, when current is being supplied to the load device. This is for the reason that the breakdown voltage of the Zener diode is selected to be higher than the supply voltage to which it is also connected. However, because of the unique connection of the Zener diode, the response of the circuit upon turn-off is superior in that the gain characteristic of the second driver transistor is effective at this time. In other words, "the sink" which absorbs current upon turnoff is not simply the Zener diode alone, but the Zener diode in series with the input of a gain element, i.e., the final transistor of the power driver circuit. Effectively, then, power is being supplied by the driver circuit but is controlled and stabilized by the Zener diode.

The foregoing and other objects, features and advantages of the invention will be apparent from the following more particular description of preferred embodiments of the invention as illustrated in the accompanying drawing.

In the drawing the figure is a schematic diagram of the preferred embodiment of the novel circuit of the present invention.

Referring to the drawing, there is shown in integrated form the circuit of the present invention. The outer terminals labelled A, B and C are those typically provided as the "pin access" to a monolithic integrated circuit. By the term monolithic is meant the well-known technique of incorporating solid state circuits in a monolith or substrate of semiconductor material by a succession of diffusion steps thereby to create the configuration of active and passive elements, as desired, embedded within the substrate. A specific technique of so incorporating these elements has often been laballed the planar technique because it entails the creation of the device junctions at a surface plane of the monolith.

The terminal A is, of course, connected to any suitable source of input signals for supplying an input signal such as the pulse shown on the figure. The terminal B is connected to reference potential, in this case, to ground. Terminal C is connected to an inductive load, designated L, which in turn is connected to a positive supply voltage +V. In the typical context referred to previously, that is, the driving of a hammer mechanism for an output printer, +V would have a value of approximately 48 volts. The integrated power driver circuit 1, shown by the dotted lines and bounded by the aforesaid terminals A, B, C, comprises a pair of transistors 10 and 12 which, in this example, are of NPN polarity, it being understood that this is merely illustrative and that the opposite polarity transistor could have been shown.

In the power driver configuration comprising the transistors 10 and 12, the collectors of these transistors are connected in common to the access pin or terminal C and thence to the common load L. The emitter of transistor 12 is connected directly to ground while the emitter of transistor 10 is connected both to the base of transistor 12 and to one end of the resistor 14. The other end of resistor 14 is connected to ground and thus is in parallel with the base-emitter input circuit of transistor 12. The Zener diode 16 is shown connected between the collector and base terminals of transistor 12.

As part of the integrated circuit configuration, the Zener diode 16 is incorporated within the semiconductor structure in accordance with the well-known planar or microelectronic technology. Likewise, the resistor 14 is also incorporated as part of the integrated circuit structure. It should be noted that the resistor 14 will serve the functions of providing thermal stability and recovery enhancement in the operation of the circuit.

In the circuit 1, the base current of transistor 12 is part of the load current of transistor 10. Hence the total current gain of the circuit 1 approaches the product of the common emitter current gain of transistors 10 and 12. The high current gain permits the circuit to have a higher input impedance when driving heavy loads, such as the load L, than would be possible using only a single transistor.

In the normal or quiescent state of the circuit 1 the potential at terminal A is such that both transistors 10 and 12 will be cut off. This results from the fact that with the base of transistor 10 below ground potential the emitter-base junction of transistor 10 is reversed biased. Likewise, with this condition obtaining, the emitter-base junction of transistor 12 is also reversed biased. However, when an input signal is applied at terminal A, such as shown, the potential thereat rises to a value sufficiently above ground and the emitter-base junction of transistor 10 will become forward biased. With transistor 10 now conducting its emitter will begin to rise above ground potential and consequently the emitter-base junction of transistor 12 will become forward biased and transistor 12 will begin to conduct. Transistor 10 will conduct to a saturation value of collector current.

The collector current for transistor 10 is designated $I_{c1}$ in the figure and the collector current for transistor 12 designated $I_{c2}$, with the total current $I_c$ being the sum of the aforesaid two currents. The emitter current for transistor 10 is, of course, equal to the base current of transistor 12 except for the current flowing through resistor 14.

Transistor 12 which supplies the bulk of the output current $I_c$ is not driven into saturation. This results from the coupling between transistors 10 and 12. Transistor 12 can not reach saturation because its base to collector voltage can never be less than the collector to emitter voltage of transistor 10 which drives it.

Transistors 10 and 12 both conducting constitute the on state of circuit 1 and in this state the Zener diode, which is connected directly across the base and collector terminals of transistor 12 is ineffective to perform its active function. In other words, it simply provides a high impedance in parallel with these terminals since the supply voltage +V is not as great as the breakdown voltage of the Zener diode. However, when the input pulse terminates such that the voltage of terminal A drops and thereby acts to turn off the circuit, the Zener diode 16 operates to perform its intended active function. Thus, as the circuit attempts to turn off, the inductive component load L has an induced EMF with the polarity indicated, that is, a back EMF which attempts to maintain the current $I_c$ that has been flowing. This back EMF, of course, is series aiding with the supply voltage, and the breakdown voltage of the Zener diode 16 is exceeded. Thereupon, an avalanche control current flows through the Zener diode 16 into the base to emitter control terminals of transistor 12. The Zener diode control current is magnified and enhanced by the gain of transistor 12. Thus, the stored energy in the form of current from the inductive component load L passes by way of the main collector to emitter junction of transistor 12 to ground. It should also be noted that this stored energy discharge current is continuously monitored and controlled by the significantly smaller avalanche control current which is in parallel through the Zener diode 16 as described. Further, because of the threshold characteristic of the Zener diode, enhanced by the gain of transistor 12, a substantially constant voltage is being maintained during the turnoff operation across the collector-base and collector-emitter terminals of transistor 12, as well as across the collector-emitter terminals of transistor 10.

The stored energy, having been discharged in a controlled manner as current, causes the avalanche control current to terminate, and the Zener diode to return to its high impedance state, thereby causing the base-emitter control terminals of transistor 12 to assume a non-conducting bias state through the base-emitter resistor 14. Thus, transistor 12 is returned to a non-conducting state similar to transistor 10.

In order for one skilled in the art to practice the invention a set of specifications for typical parts and values is provided as follows:

Supply voltage +V=+48 volts
Inductor L—2.0 millihenries with $R_{dc}=10\Omega$
Resistor 14—100Ω
$I_c \approx 4.7$ A.
$I_b(\text{on}) \leq 5$ ma.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention.

What is claimed is:

1. A power driver circuit for driving heavy current into an inductive load comprising a first transistor and a second transistor, connected such that substantially the entire load current of the first transistor flows through the emitter-base junction of said second transistor when said circuit is in the on state;

a load comprising an inductive component and a supply voltage connected to the output terminals of said circuit;

a protective means for protecting said transistors upon turnoff of said power driver circuit, said means comprising an avalanche regulator connected between the collector and the base terminals of said second transistor and to said supply voltage such that when said circuit is turned on a high impedance is provided, and when said circuit is turned off, the breakdown voltage of said avalanche regulator is exceeded and the stored energy of said inductive load is absorbed by said second transistor.

2. The device described in claim 1, wherein the avalanche regulator is a Zener diode.

3. A power driver circuit as defined in claim 1, wherein the emitter of said first transistor is connected to the base of said second transistor and wherein a resistor is connected in parallel with the emitter-base junction of said second transistor.

4. A power driver circuit for driving heavy current comprising a first transistor and a second transistor, the on and off states for said driver circuit substantially corresponding to coincident conducting and non-conducting states, respectively, for said transistors;

a common inductive load for said transistors and a supply voltage connected to the output terminals of said circuit;

a protective means for protecting said transistors upon turnoff of said power driver circuit, said means comprising a Zener diode connected between the collector and base terminals of said second transistor and to said supply voltage such that when said circuit is turned on, a high impedance is provided and when said circuit is turned off the breakdown voltage of said Zener diode is exceeded and the stored energy of said inductive load is absorbed by said second transistor.

5. A power driver circuit as defined in claim 4, wherein the emitter of said first transistor is connected to the base of said second transistor and wherein a resistor is connected in parallel with the emitter-base junction of said second transistor.

6. A power driver circuit comprising a first transistor and a second transistor, the collectors of said transistors being connected to each other and to an inductive component load and a supply voltage, the on and off states for said driver circuit substantially corresponding to the coincident conductive and non-conductive states, respectively, for said transistors and substantially the entire load current of the first transistor flowing through the emitter-base junction of the second transistor when said circuit is in the on state;

a protective means for protecting said transistors upon turnoff of said power driver circuit, said means comprising a Zener diode connected between the collector and base terminals of said second transistor to said supply voltage such that when said circuit is turned on a high impedance is provided, and when said circuit is turned off, the breakdown voltage of said Zener diode is exceeded and the stored energy of said inductive load is absorbed by said second transistor.

7. A power driver circuit as defined in claim 6, wherein the emitter of said first transistor is connected to the base of said second transistor and wherein a resistor is connected in parallel with the emitter-base junction of said second transistor.

References Cited

UNITED STATES PATENTS

| | | | |
|---|---|---|---|
| 3,016,477 | 1/1962 | Naborowski. | |
| 3,112,431 | 11/1963 | Pederson | 317—148.5 |
| 3,115,610 | 12/1963 | Beguin. | |
| 3,201,681 | 8/1965 | Wilgen et al. | |
| 3,210,561 | 10/1965 | Ullman | 307—315 XR |
| 3,280,368 | 10/1966 | Ahmed et al. | 307—315 XR |
| 3,202,904 | 8/1965 | Madland | 323—58 |
| 3,191,101 | 6/1965 | Reszka | 317—151 |

LEE T. HIX, *Primary Examiner.*

W. SHOOP, *Assistant Examiner.*

U.S. Cl. X.R.

307—213, 315; 317—43, 123, 148.5